United States Patent [19]
Thurlow et al.

[11] Patent Number: 4,536,653
[45] Date of Patent: Aug. 20, 1985

[54] SEISMIC RESTRAINT MEANS

[75] Inventors: Norman C. Thurlow, Horseheads; Walter R. Hayter, Elmira; Richard C. Schockner, Big Flats, all of N.Y.

[73] Assignee: Westinghouse Electric Corp., Pittsburgh, Pa.

[21] Appl. No.: 461,790

[22] Filed: Jan. 28, 1983

[51] Int. Cl.³ .............................................. G01T 3/00
[52] U.S. Cl. ..................................... 250/390; 250/374
[58] Field of Search ............... 376/153, 254, 255, 285; 250/256, 374, 390–392; 267/137, 147

[56] References Cited

U.S. PATENT DOCUMENTS

| | | | |
|---|---|---|---|
| 2,385,857 | 10/1945 | Herzog | 250/256 |
| 3,406,537 | 10/1968 | Falkner, Jr. | 267/137 |
| 4,340,210 | 7/1982 | Townsend | 267/137 |

FOREIGN PATENT DOCUMENTS 52-64593  5/1977  Japan ................................. 376/254

Primary Examiner—Alfred E. Smith
Assistant Examiner—Carolyn E. Fields
Attorney, Agent, or Firm—Thomas R. Trempus

[57] ABSTRACT

A seismic restraint means for supporting a generally cylindrical nuclear radiation detector within a tubular thimble. At least two housing segments are joined together to form a clamp-like ring about the cylinder. At least one energy absorbing means is operably associated with each segment for generally radial displacement relative thereto. The energy absorbing means are characterized by a damping means therein which is characterized by resiliency and a lack of resonance. The damping means is preferably a knitted metal pad formed from wound, flattened wire-mesh tubing, stainless steel wool, or thin metal strip looped to form a sponge-like material.

8 Claims, 3 Drawing Figures

4,536,653

SEISMIC RESTRAINT MEANS

BACKGROUND OF THE INVENTION

The present invention relates to mechanical seismic restraint means which are used in nuclear safety systems. In particular, the seismic restraint means according to this invention is usable with generally cylindrical out-of-core nuclear radiation detectors which must be mechanically supported in a vertical position about a nuclear reactor vessel. This invention restrains the motion of a radiation detector during a seismic event and substantially absorbs vibration forces induced thereby which would otherwise be transmitted to the internal mechanism of the detector.

The typical out-of-core radiation detector utilized in nuclear safety systems is an ion chamber of substantial length, for example about 6 to 12 feet long. The ion chamber typically utilizes concentric cylindrical electrodes which are maintained a fixed distance apart, with opposed electrical potentials for attracting respectively the oppositely charged particles which are generated in the ion chamber by neutrons from the reactor core. Such ion chambers are thus used to monitor reactor activity and to indicate the operational status of the reactor. The ion chamber is typically mounted in an elongated tubular thimble which is typically open ended at the top and may be closed or open ended at the bottom. A plurality of such thimbles are spaced around the reactor vessel in a predetermined array to permit sampling of the neutron flux level in the vicinity of the reactor vessel. Seismic activity can result in the ion chamber striking the thimble wall generating significant forces which cause electrical noise to be present in the output signal from such ion chambers. This electrical noise is thought to be a result of the vibratory motion of the electrodes relative to each other in the ion chamber.

The tubular thimbles within which the ion chamber radiation detectors are typically mounted can have a variable inside diameter, as is typical for commercially available piping which is used in forming the reactor thimbles. A typical 6 inch nominal diameter schedule 80 piping typically will have an inside diameter which ranges from about 5.931 inch to 5.622 inch, and 6 inch nominal diameter schedule 40 pipe has a resultant inside diameter range of from about 6.197 inch to 5.964 inch. With such inside diameter range variations of up to about 0.2 inch inside diameter, it is difficult to provide a detector support means which provides a uniform fit and support of the detector assembly for the wide range of thimble inside diameters. It has thus been necessary to provide a rather loose fit in current detector support assemblies relative to the thimble ID. This leads to high levels of acceleration and deceleration of the detector assembly during seismic activity and results in undesirable electrical signals generated by motion of the internal detector parts. The presently utilized detector support assemblies are also rigid assemblies and there is thus no damping of impact shocks experienced by the assembly during seismic activity.

Additionally, the qualification of neutron detectors for use in the thimble requires that the detectors be capable of operating before, during and after a seismic event. Seismic event test sequences have been developed to conservatively simulate the seismic conditions predicted for a reactor. The capability of the neutron detector to survive the seismic test depends upon the energy absorption characteristics of the detector structure and the amount of energy transmitted to that structure. Internal damage to the detector mechanism and/or excessive and noisy signal outputs can result if either the detector or its support structure are unable to dissipate the seismic energy.

An example of a seismic restraint device is disclosed in U.S. patent application Ser. No. 382,437 filed May 26, 1982 which is assigned to the assignee of the present invention and which is incorporated herein by reference. The seismic restraint device utilizes spring bias means to mount a radiation detector in a tubular thimble.

It is therefore, an object of this invention to provide a seismic restraint means capable of absorbing and dissipating a significant fraction of the seismic energy that the detector can receive during a seismic event, either actual or simulated and can reduce electrical noise.

It is another object of the present invention to provide a seismic restraint means which maintains electrical isolation between the detector and the inside wall of the thimble.

It is also an object of this invention to provide a seismic restraint means which provides support for a detector assembly within a tubular thimble where the range of thimble inside diameters has significant variation.

SUMMARY OF THE INVENTION

A seismic restraint means includes at least two interconnecting housing segments formed into a clamp-like ring which is securably connectable about a generally cylindrical nuclear radiation detector. Each housing segment has at least one energy absorbing means operably associated with and extending therefrom. The energy absorbing means are mounted in each housing to allow radial displacement relative to the detector. Each energy absorbing means includes a thimble contacting means and a motion damping means disposed between the thimble contacting means and the housing segment. The thimble contacting means is electrically non-conductive and the damping means is characterized by resiliency and a lack of resonance.

BRIEF DESCRIPTION OF THE DRAWINGS

The above as well as other features and advantages of this invention will become apparent through consideration of the detailed description in connection with the accompanying drawings in which.

DETAILED DESCRIPTION OF THE INVENTION

Figure 1:
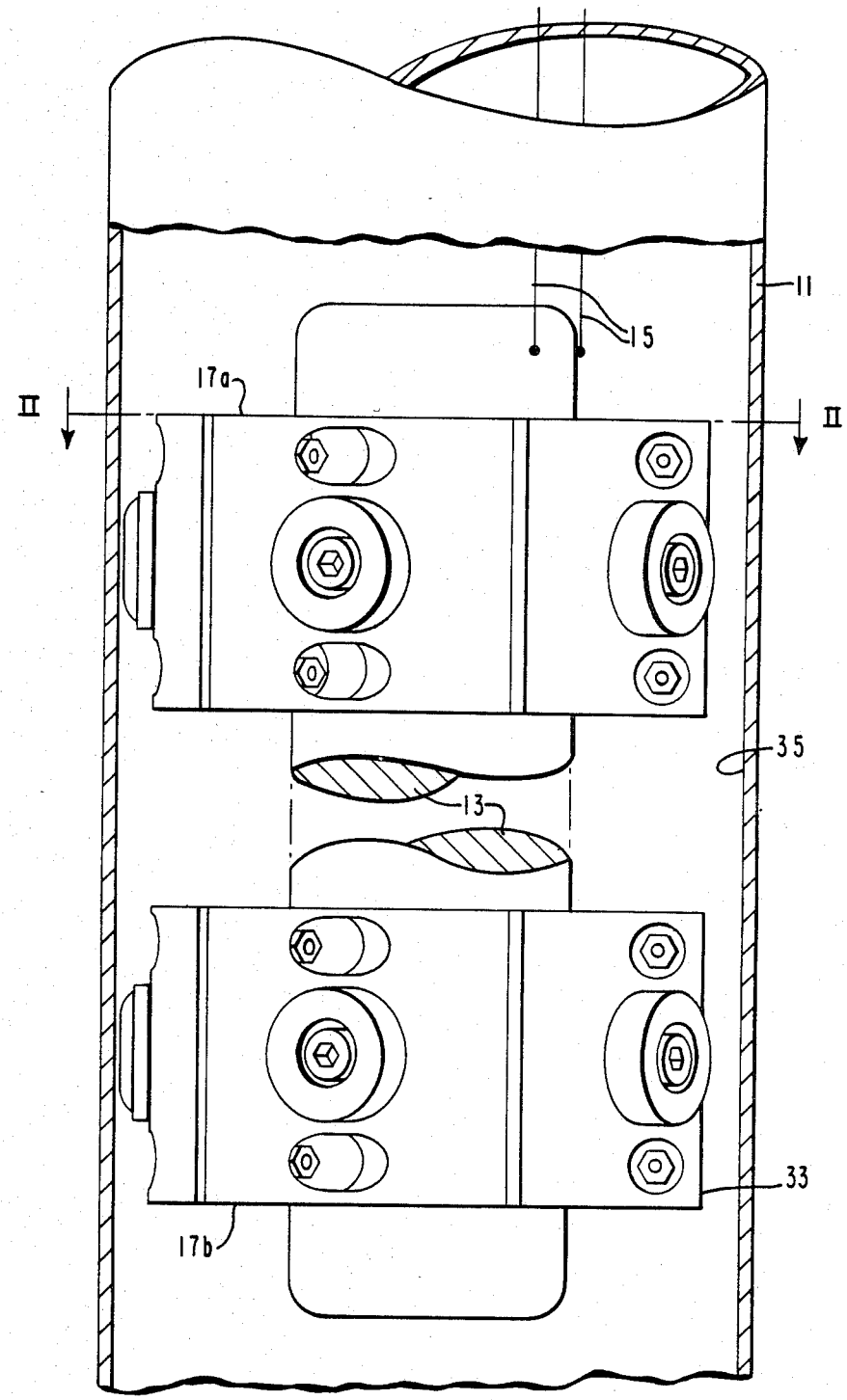
FIG. 1 is a side elevational view of an elongated out-of-core radiation detector mounted by means of the seismic restraint means of the present invention within a tubular thimble with portions of the thimble cut away.
Figure 2:
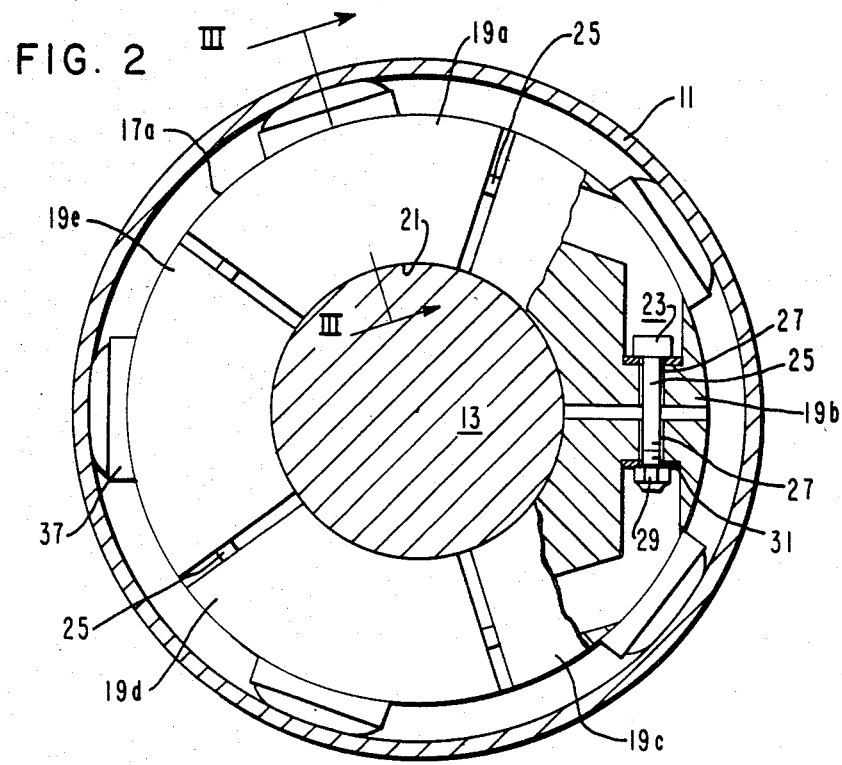
FIG. 2 is an enlarged view taken along the line II—II of FIG. 1 to illustrate a plan view of the seismic restraint means of the present invention.

The invention can be understood by reference to the embodiments seen in FIGS. 1 and 2. Turning to FIG. 1, an elongated vertically disposed tubular thimble 11, is one of a plurality of such thimbles which are disposed about a nuclear reactor vessel within the containment building of a nuclear power plant. The thimble 11 is typically a 6 or 7 inch nominal diameter schedule 40 or schedule 80 pipe, which is open at the upper end, and may be closed or open at the bottom end. An elongated, generally cylindrical nuclear radiation detector 13 is mounted within the thimble 11 in a generally coaxial relationship therewith. The radiation detector 13 is typically of the ion chamber type which has an outside diameter of about 3 inches, and ranges from approximately one foot to about 12 feet long. Electrical leads 15 extend from one end of the radiation detector 13 and are in communication with a remotely located control system which provides operating input potential and output signal measuring means. The radiation detector 13 generates an output signal which is indicative of neutron flux passing through the detector.

A plurality of seismic restraint means, generally indicated by the reference characters 17a and 17b are longitudinally spaced along the length of the cylindrical radiation detector 13 and are securely connected thereto to provide a support means for the detector 13 within the thimble 11. The seismic restraint means 17a and 17b are identical in structure. One such restraint means 17a is best seen in detail in FIGS. 2 and 3.

The seismic restraint means 17a comprises a plurality of housing segments 19a, 19b, 19c, 19d and 19e, each having an arcuate interior surface 21 with a radius of curvature slightly larger than the generally cylindrical radiation detector 13. The individual housing segments 19a through 19e are brought together about the detector 13, with a plurality of fastening means generally indicated by the reference character 23, securely connecting the plurality of housing segments to the detector 13. The fastening means 23 each comprise a bolt 25 passing through an aperture 27 in each of a contiguous pair of housing segments. The bolt 25 is secured by a lock nut 29 and provided with washers 31. Alternatively, the housing segments can be secured together by a fastening means which comprises a bolt passing through an aperture in a first housing segment and engaging a threaded aperture in a second housing segment. In such an alternative arrangement, each housing segment is provided with a pair of apertures, one of which is threaded to securely receive a bolt therein. When the plurality of housing segments are fastened together, they define a generally circular seismic restraint means 17a about the cylindrical detector 13. The preferably circular perimeter 33 of the seismic restraint means 17a has a slightly smaller diameter than the inside diameter 35 of the thimble 11.

Figure 3:
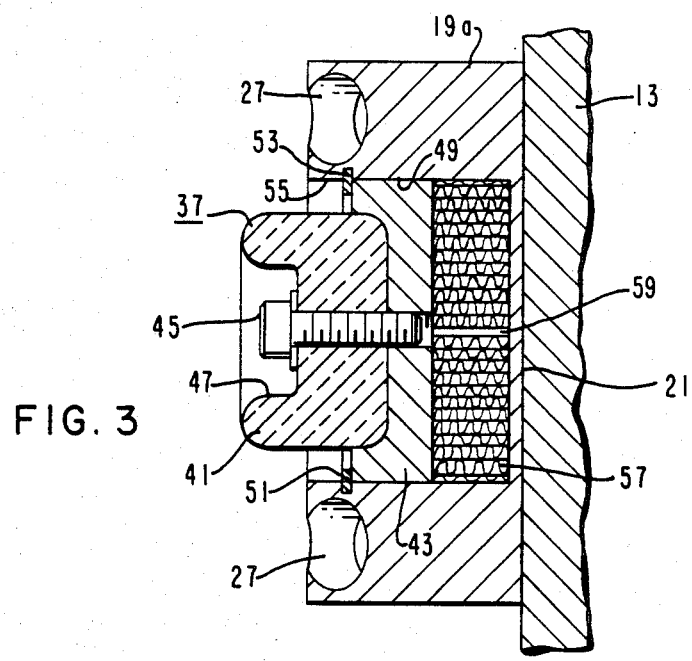
FIG. 3 is a cross sectional, side elevational view of a seismic restraint means segment illustrating an energy absorbing means, all according to the teachings of this invention.

The preferred embodiment of a housing segment 19a of the seismic restraint means 17a is best understood through consideration of FIGS. 2 and 3. The housing segment 19a includes a means generally indicated at 37 for absorbing energy generated by a seismic event. The energy is absorbed in a nonlinear manner as a function of displacement of the means 37, thus providing high energy dissipation within the restraint structure. An example of a force versus displacement function for a device according to this invention is:

$$F = ax^b$$

where F is the applied force, x is the displacement of the bearing surface with respect to its original position and a and b are constants that depend on the structure of the restraint. One of the significant factors resulting from this equation is that the force versus displacement function is nonlinear such that large displacements produce several times the restraining force that small displacements produce.

The energy absorbing means 37 of a segment 19a is shown in cross-sectional, side elevational view in FIG. 3 and includes a thimble contact means and damping means. A thimble contact means, preferably ceramic insulator 41, is mounted on a plunger member 43 by means of a securing means 45 which is recessed as at 47. The ceramic insulator 41 provides electrical insulation between the radiation detector 13 and the thimble 11. The plunger member 43 is preferably circular in cross section and slidably disposed within a pad well or bore 49 in the housing segment 19a. The plunger member 43 is removably retained in the bore 49 by means of a C-shaped retaining ring 51 placed in a circumferentially disposed slot 53 in the inside surface 55 of the pad well 49. Plunger motion within the pad well 49 is restrained by a damping means 57 consisting of a resilient material which is non-resonant. One such damping means is a knitted metal pad 57 disposed between the bottom of the plunger member 43 and the bottom of the pad well 49. The knitted metal pad 49 is preferably formed metal, mesh tubing that has been flattened and then wound to form a disk-like pad with an outside diameter slightly smaller than the inside diameter of the pad well 49. The ends 59 of the pad 57 can be welded to maintain the wound form thereof as shown. The pad 57 need not be and preferably is not, wound tightly, but rather the mesh tubing is wound to form a pad 57 with an annular center opening 59. A metal, mesh tubing which is well suited for use in the formation of a damping means is described in U.S. Pat. No. 4,340,210, Pile Driver Cushion, by P. Townsend, the content of which is incorporated herein by reference.

Various other pad constructions may also be used, examples of which include stainless steel wool and a thin metal strip looped to form a sponge-like structure. The previously described force versus deflection function produced by the pad 57 is controlled by the characteristics of the material from which the pad is formed. Herein the wire size and wire mesh size together with the forming force used in flattening and winding the tubing into a pad are controlling.

During a seismic event, the ceramic insulator 41 contacts the thimble structure. As the ceramic insulator and plunger compress the pad 57, a portion of the kinetic energy that would normally be imparted to the radiation detector 13 is instead absorbed by the pad 57. The pad 57 is overdamped and as a result, does not immediately spring back to the original position. The energy absorbing means 37 according to this invention does not contribute to the detector the type of vibrational movement that is typically generated in prior seismic restraint devices. Because seismic motion is random, there is a finite probability that the energy absorbing means 37 will be subjected to a second and possibly a third blow before it recovers from the first event. The result will be shorter displacement before the motion of the plunger is restrained, with a slightly greater force being transmitted to the detector for each successive event. Contrary to prior device, the present energy absorbing means 37 does not experience any resonance point in the 1 hertz to 100 hertz range in which the pad 57 will effectively cease to provide restraint.

The energy absorbing means 37 can be adapted to fit various sizes of thimbles or instrument wells through the use of one or more spacing shims 61 placed between the plunger 43 and the ceramic insulator 41.

While a seismic restraint means consisting of five segments with a single energy absorbing means in each segment has been shown, a variety of configurations are possible. For example, the seismic restraint means might comprise two segments with two or three energy absorbing means therein or three segments with at least one energy absorbing means in each segment.

What has been described is a seismic restraint means with improved energy absorbing characteristics.

What is claimed is:

1. A seismic restraint means for supporting a generally cylindrical nuclear radiation detector within a tubular thimble comprising:

at least two housing segments having interconnecting means associated therewith for attaching one said housing segment to another said housing segment in order to form a clamp-like ring which is securably connectable about the generally cylindrical detector, each said housing segment having at least one radially aligned bore therein and energy absorbing means operably associated with and extending from each of said housing segment bores for generally radial displacement relative to said detector such that the tubular thimble is contacted thereby, said energy absorbing means including a motion damping means consisting of a resilient material which is non-resonant disposed in said bore and a plunger means having an electrically non-conductive thimble contacting means secured thereon, said bore being dimensional to receive said plunger therein, in contact with said motion damping means, such that radial displacement of said plunger means is effected through the compression and expansion of said motion damping means disposed within said bore.

2. The seismic restraint means according to claim 1 wherein the damping means is a knitted metal pad formed from wound, flattened mesh tubing.

3. The seismic restraint means according to claim 1 wherein the thimble contacting means is removably secured to the plunger means and the energy absorbing means includes at least one spacing shim disposed therebetween.

4. The seismic restraint means according to claim 1 wherein each of the two housing segments includes three energy absorbing means operably associated therewith.

5. The seismic restraint means according to claim 1 comprising five housing segments and an energy absorbing means operably associated with each said housing segment.

6. The seismic restraint means according to claim 1 wherein the damping means is stainless steel wool.

7. The seismic restraint means according to claim 1 wherein the damping means is a thin metal strip looped to form a sponge-like structure.

8. In combination, a generally cylindrical nuclear radiation detector, a tubular thimble on which said detector is disposed and at least two spaced apart seismic restraint means for supporting said detector within said thimble, each of said restraint means comprising at least two housing segments having interconnecting means associated therewith for attaching one said housing segment to another said housing segment in order to form a clamp-like ring which is securably connectable about the generally cylindrical detector, each said housing segment having at least one radially aligned bore therein and energy absorbing means operably associated with and extending from each of said housing segment bores for generally radial displacement relative to said detector such that the tubular thimble is contacted thereby, said energy absorbing means including a motion damping means consisting of a resilient material which is non-resonant disposed in said bore and a plunger means having an electrically non-conductive thimble contacting means secured thereon, said bore being dimensional to receive said plunger therein, in contact with said motion damping means, such that radial displacement of said plunger means is effected through the compression and expansion of said motion damping means disposed within said bore.

* * * * *